J. D. TOSCAS.
LOCK NUT.
APPLICATION FILED NOV. 10, 1919.

1,379,371. Patented May 24, 1921.

Inventor
John D. Toscas
Daniel A. Brennan
Attorney

UNITED STATES PATENT OFFICE.

JOHN D. TOSCAS, OF CHICAGO, ILLINOIS.

LOCK-NUT.

1,379,371.

Specification of Letters Patent.  Patented May 24, 1921.

Application filed November 10, 1919. Serial No. 337,048.

*To all whom it may concern:*

Be it known that I, JOHN D. TOSCAS, a citizen of the United States, residing at Chicago, county of Cook, and State of Illinois, have invented certain new and useful Improvements in Lock-Nuts, of which the following is a specification.

The invention relates to lock nuts and has for its principal object the provision of a removable pin which in conjunction with the lock nut not only prevents rotation of the latter, but which itself is also secured against displacement.

A further object of the invention aims at the provision of a modified cotter pin, having a head of a configuration to fit a dove-tail slot in the nut. The improved pin is adapted to be easily removed when the nut is to be tightened or loosened, or entirely removed.

Preferred embodiments of the invention are indicated in the drawing and described in the specification, and the novel features are particularly pointed out in the claim forming part of the specification. In said drawing, Figure 1 is an elevational view of a bolt, a nut secured thereon and equipped with the invention.

Figure 3:
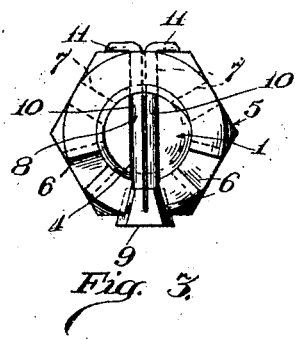
Fig. 3 is a top plan view of the part shown in Fig. 1.
Figures 4, 5:
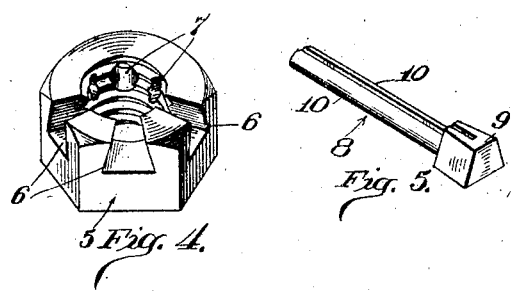
Fig. 4 is a perspective view of a nut.
Fig. 5 is a perspective view of a pin.
Figure 1:
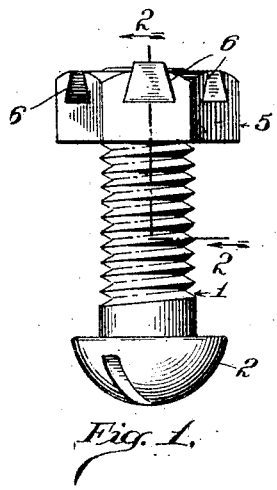
Figure 6:
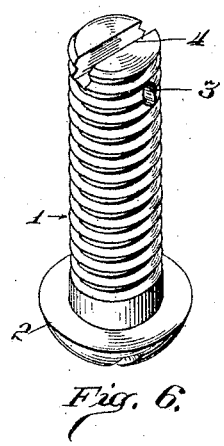
Fig. 6 is a perspective view of a bolt.
Figure 2:
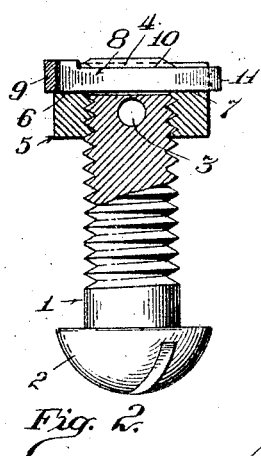
Fig. 2 is a section on line 2—2 of Fig. 1.

Referring to the several figures of the drawing, 1 designates a bolt or screw equipped with a head 2 and having a spindle provided with a transverse bore 3. A slot 4 is disposed on the end-face of the spindle for a purpose hereinafter referred to. The bore 3 and the groove 4 have a distance from one another in vertical direction. Coacting with the spindle 1 is a nut 5, which is provided with a plurality of spaced, dove-tailed grooves 6 extending through the wall of the nut. A plurality of bores 7 are disposed in diametrical opposition to the grooves 6. A cotter pin 8, particularly shown in Fig. 5, is employed in conjunction with a nut and comprises a head portion 9 which has a configuration adapted to fit within any one of the dove-tailed grooves 6. Attention is called to the fact that the head 9 of the cotter pin has a length greater than the thickness of the nut wall, so that in functional position a portion of the head protrudes without the nut to afford an easy hold of the cotter pin when removal thereof is desired. Integral with the head are the blade members 10 which, after having been inserted through a bore 7 are turned in opposite direction as shown in Fig. 3, so that the end portions 11 abut with an angular face of the nut.

Figure 8:
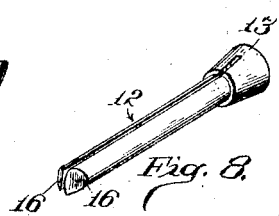
Fig. 8 is a perspective view of a modified pin.
Figure 7:
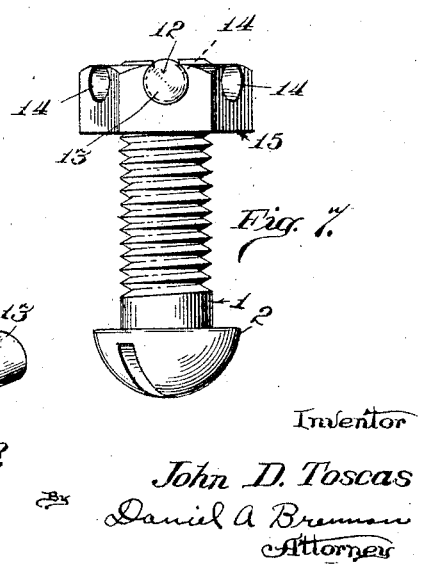
Fig. 7 is an elevational view of a modification.

It will be easily seen that the nut may be locked in several positions on the screw or bolt in accordance with the bore 3 and the groove 4. If, for instance, any one of the dove-tailed grooves of the nut is placed in alinement of the bore 3 of the groove, a cotter pin 8 may be introduced through the registering groove 6 and the bore 3 or groove 4, respectively, for the purpose of securing the nut against rotation. The parts in operative position are indicated in Fig. 3, where as previously mentioned the head 9 slightly protrudes from the nut, so as to afford an easy hold thereof when removal of the pin is desired. In Figs. 7 and 8 a modified construction of the pin and nut is shown. The cotter pin 12 having in this instance a conical head 13 adapted to fit within circular cut-outs 14 of the nut 15, which circular cut-outs again are spaced from one another and register with diametrically opposite bores of sufficient diameter to permit the passage of the blades 16 of the cotter pin 12.

Of the foregoing it is obvious that the lock nut is characterized by the fact that the pin securing the nut against rotation does not work loose on a constant vibration of the machine on which the lock nut is employed and that an easy hold is provided when it is desired to remove the pin. It is obvious that the construction of the pin head does not necessarily have to be of the specific form shown in the drawing and various other forms may be adapted without departing from the spirit of the invention. All changes and variations are included which fairly fall within the scope of the invention as defined by the appended claim.

I claim:

In combination with a nut, having a plurality of large uniformly tapering openings extending through the wall of the nut and a plurality of smaller bores in diametrical opposition of said opening, a cotter pin having a uniformly tapering head adapted to have a wedging fit within the tapering opening in the nut and the opposite end of the cotter pin extending through the diametrical opposite bore with its extreme free ends bent against the side wall of the nut.

Signed at 36 West Randolph street, in the county of Cook and State of Illinois, this 25th day of August, 1919, in the presence of two witnesses.

J. D. TOSCAS.

Witnesses:
 TOM LOUNGES,
 GUST CHRISTOS.